United States Patent [19]

Hanson

[11] Patent Number: 4,581,970

[45] Date of Patent: Apr. 15, 1986

[54] MACHINE FOR PRESCORING ENGLISH MUFFINS OR THE LIKE

[76] Inventor: Douglas R. Hanson, 1720 - 9th Ave. South, Anoka, Minn. 55303

[21] Appl. No.: 690,513

[22] Filed: Jan. 10, 1985

[51] Int. Cl.[4] .............................................. B26D 3/30
[52] U.S. Cl. ...................................... 83/871; 83/326; 83/423; 225/97
[58] Field of Search .................................. 83/870–874, 83/879–887, 326, 423; 225/93, 97

[56] References Cited

U.S. PATENT DOCUMENTS

| | | | |
|---|---|---|---|
| 3,192,976 | 7/1965 | Clock | 83/871 |
| 4,287,801 | 9/1981 | Hanson | 83/871 |

Primary Examiner—James M. Meister
Attorney, Agent, or Firm—Kinney & Lange

[57] ABSTRACT

A machine for carrying baked English muffins along a plane, and scoring the edges of the muffins all around the outer edge surface during a single pass through the machine by controlling the rotation of the muffin about an axis perpendicular to the general muffin plane at the same time that a sharp blade makes an incision into the skin of the muffin a short distance for scoring the outer periphery.

15 Claims, 11 Drawing Figures

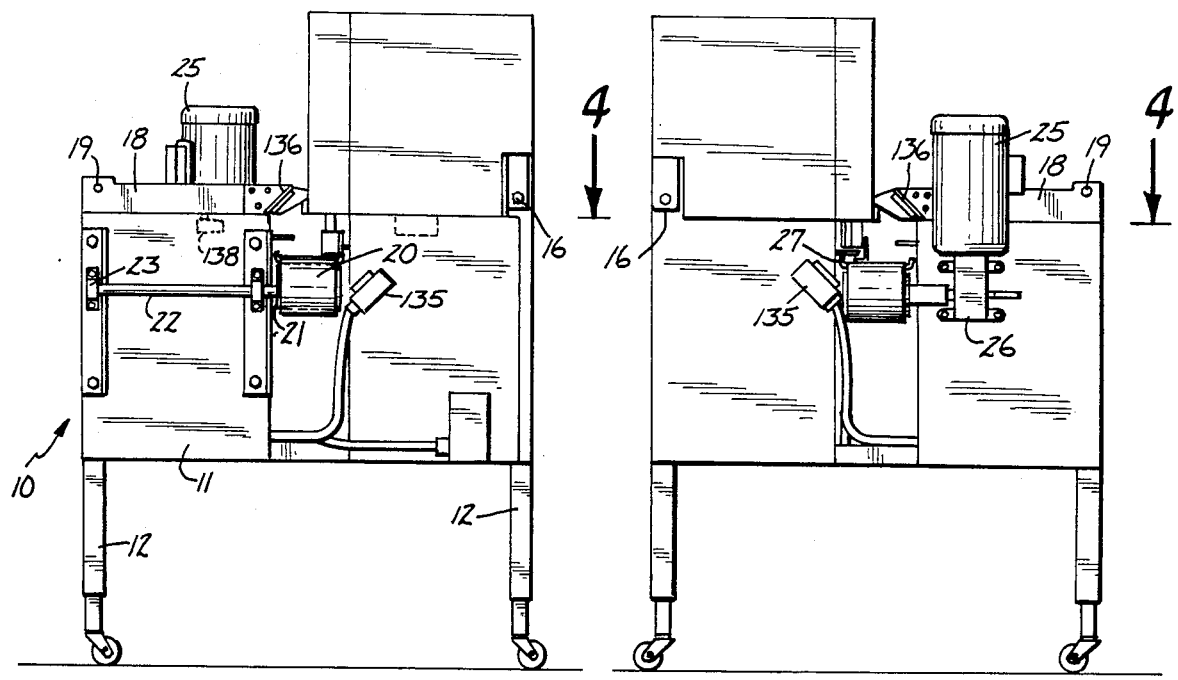
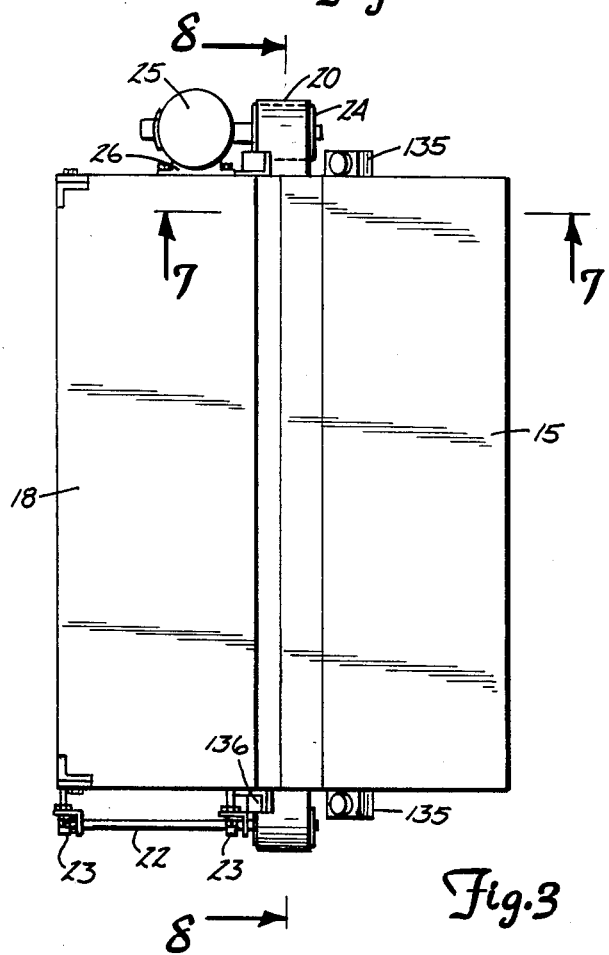
Fig. 1  Fig. 2  Fig. 3

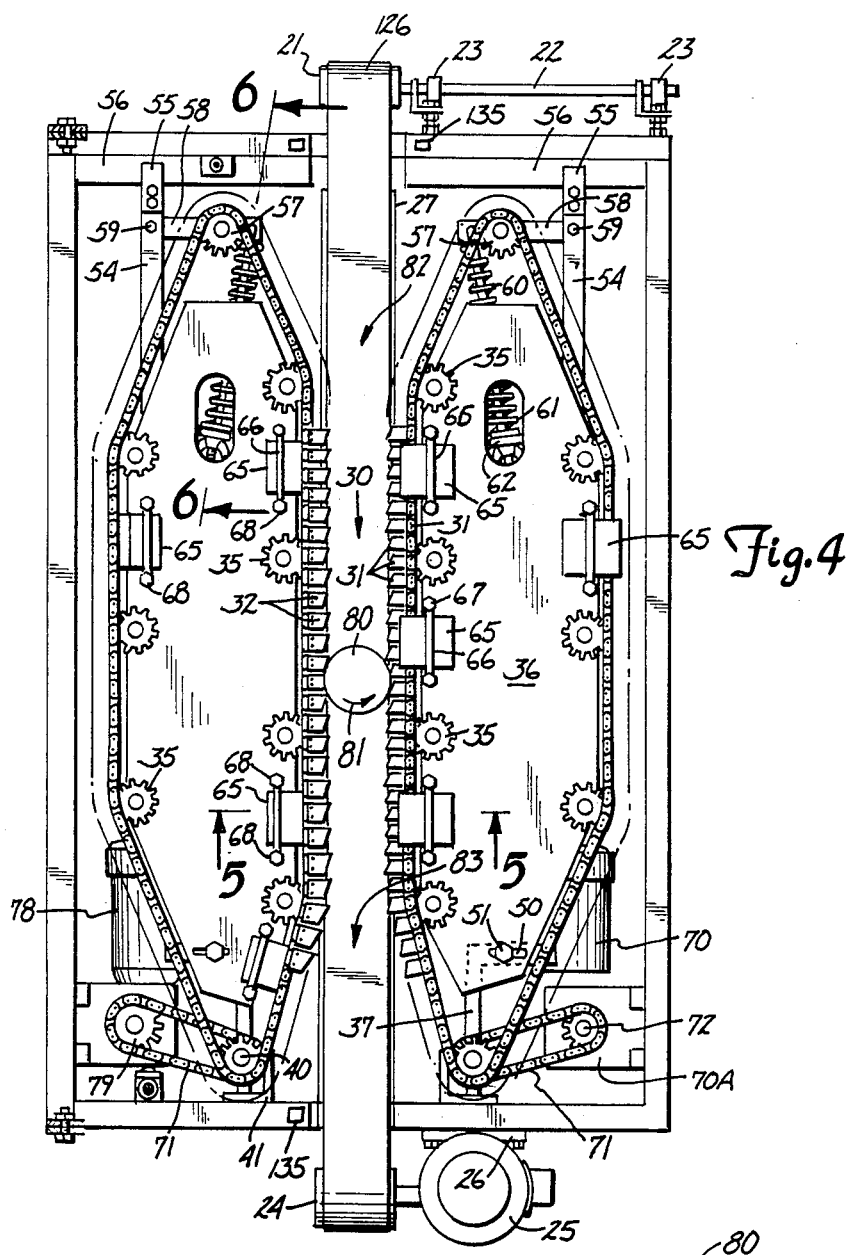
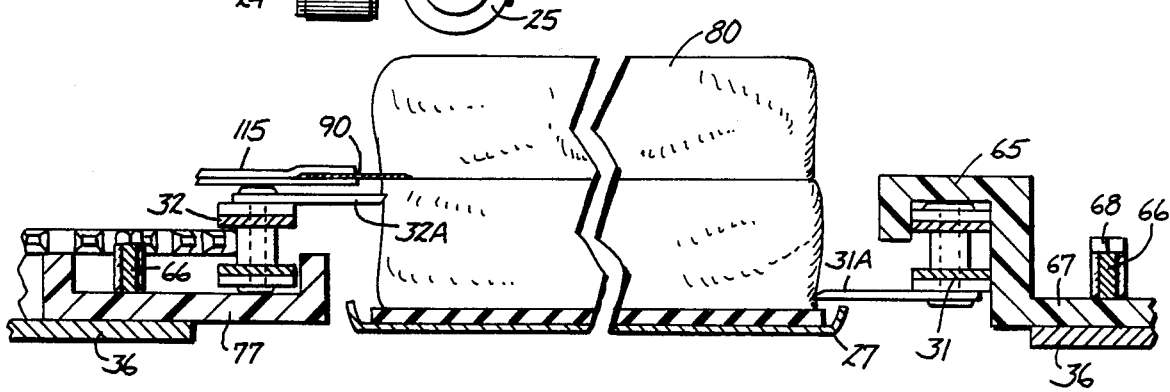
Fig.5

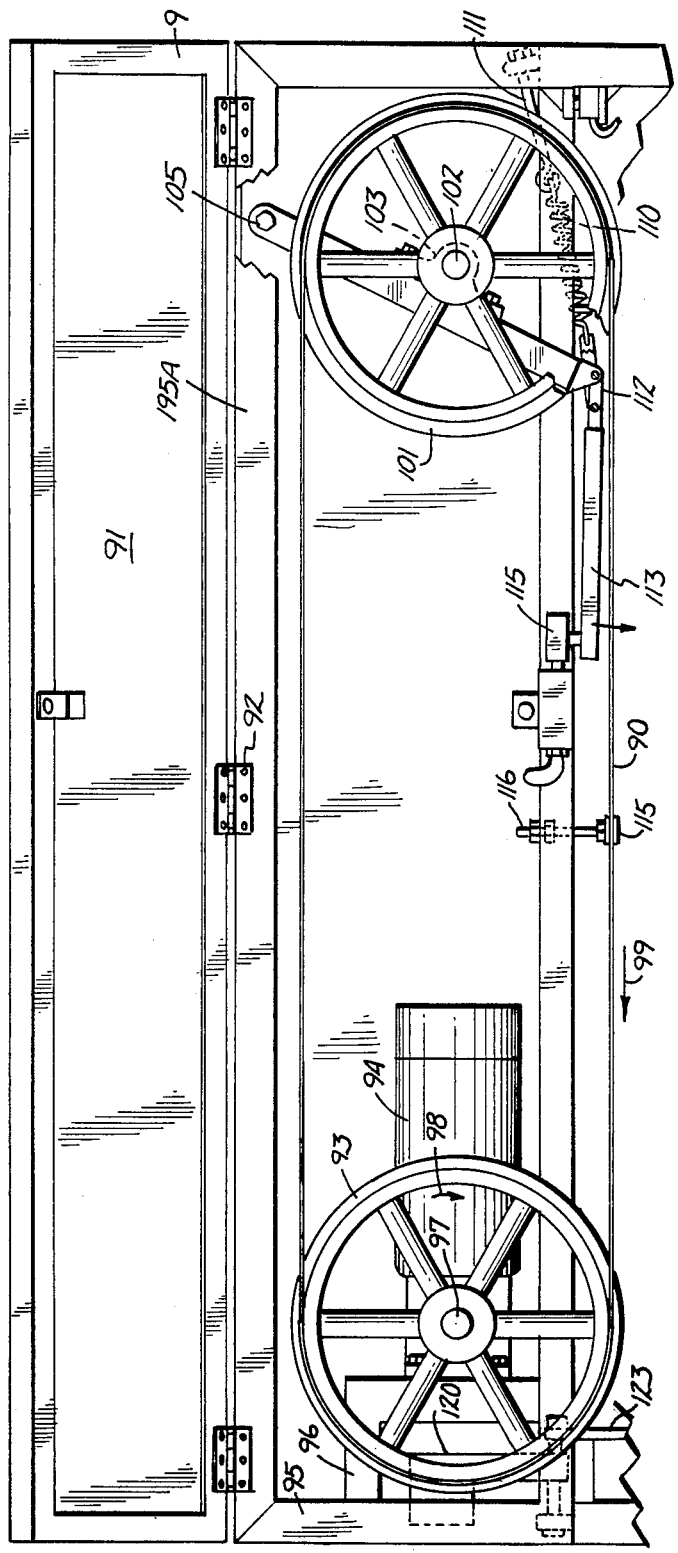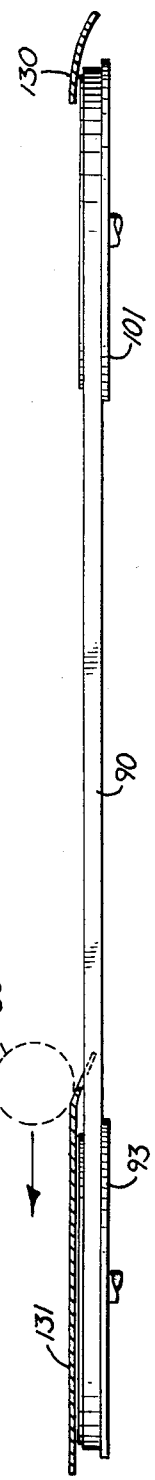
Fig. 8
Fig. 9

MACHINE FOR PRESCORING ENGLISH MUFFINS OR THE LIKE

BACKGROUND OF THE INVENTION

1. Field of the Invention.

The present invention relates to a device for prescoring the edges of a muffin as the muffin is moves through the machine.

2. Description of the Prior Art.

Various attempts have been made for perforating or handling the edges of English muffins in particular. My U.S. Pat. No. 4,287,801, issued Sept. 8, 1981 for a Device For Perforating Bakery Goods Such As English Muffins shows a unit that will insert sharp blades across the muffin to perforate it sufficiently so that as the muffin halves are separated manually they will tear easily and along a definite tearing plane to provide a desired textural appearance to the muffin surface.

However, it is desired by the bakeries that the tougher skin of the muffin be sliced or prescored all the way around its periphery a short distance in (for example about a quarter of an inch) before the perforating operation by a machine such as that shown in U.S. Pat. No. 4,287,801 is accomplished. The continuous cut prevents unwanted tears along the edges of the muffin, and provides for an easier separation of the two muffin halves manually for a nice appearing muffin when it is separated.

SUMMARY OF THE INVENTION

The present invention relates to a prescoring machine for prescoring English muffins in particular, and other bakery goods if desired, by providing a sharp slicing band that will penetrate the muffin skin a short distance, for example a quarter of an inch or so, and as the muffin is moved along a length of the slicing band, means are provided for rotating the muffin so that it is scored all the way around its periphery at a uniform depth.

The machine is equipped with alignment and adjustment members for insuring that the penetration of the slicing blade is adequate, and also for insuring that the movement path of the muffin or other product is maintained at a proper relationship to the cutting blade.

The unit is interlocked so that the mechanism carrying the cutting blade has to be in proper location and all covers in place before the cutting blade will be operated.

BRIEF DESCRIPTION OF THE DRAWINGS

FIG. 1 is an end elevational view of a machine made according to the present invention;

FIG. 2 is an end view of the device of FIG. 1 as viewed from an opposite end from FIG. 1;

FIG. 3 is a top plan view of the device of the invention with all of the covers in place;

FIG. 4 is a sectional view taken as on line 4—4 in FIG. 2;

FIG. 5 is a sectional view taken as on line 5—5 in FIG. 4;

FIG. 8 is a sectional view taken as on line 8—8 in FIG. 3;

FIG. 9 is a bottom plan view of the cutting blade and mounting wheels shown in FIG. 8;

DETAILED DESCRIPTION OF THE PREFERRED EMBODIMENTS

Figure 7:
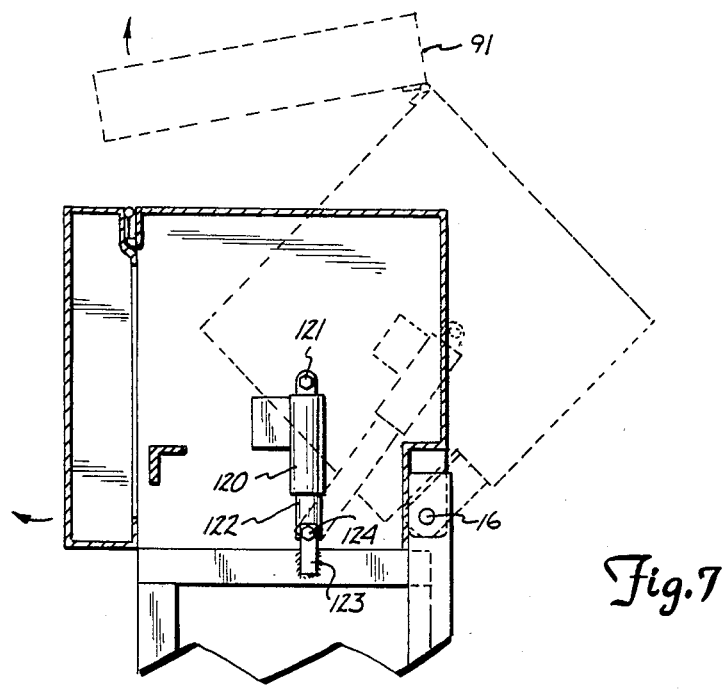
FIG. 7 is a fragmentary sectional view taken as on line 7—7 in FIG. 1.

A machine for prescoring English muffins is illustrated generally at 10 and includes a frame 11 having support legs 12,12 for supporting the frame. The frame comprises a cabinet that has interior structural members (not shown) and at the upper end has a slicing band housing 15, which extends approximately one-half of the lateral width of the machine for prescoring, and comprises a secondary support frame which will support an endless cutting band on a pair of guide pulleys as will be explained. The secondary housing 15 is pivotally mounted as at 16 to the main frame 11 about a longitudinal axis, and will tilt between its working position shown in FIGS. 1, 2 and 3, to a raised or retracted position which is shown in dotted lines in FIG. 7.

A second safety cover 18 is pivotally mounted as at 19 on a longitudinal axis along the opposite side of the frame 11 from the pivot axis 16, and this cover 18 will pivot into and out of position about the pivot axis 19 to permit access to some of the internal working parts.

The machine is made to transport or move an English muffin along the longitudinal length of the machine, in position to be sliced a shallow depth by a slicing band in the housing 15, and at the same time be rotated 360° about an upright axis as the muffin is transported. An English muffin support comprises an endless belt 20 that is mounted over a first idler roller 21 at an input end shown in FIG. 1. The roller shown at 21 is mounted onto a shaft 22 which in turn is rotatably mounted in bearings 23,23 mounted onto the end wall of the frame 11. The belt 20 also is mounted over a drive pulley 24 at the opposite end of the frame 11, and the drive pulley 24 is mounted onto an output shaft of a motor gear reducer set 25 that in turn is bolted with a base 26 to the opposite end of the frame 11 from the bearings 23.

A support channel 27 (FIG. 5) is suitably mounted on the frame and supports the top length or reach of the belt 20 as it moves along the longitudinal axis of the frame.

English muffins are placed onto the belt 20 in a suitable manner, at the input end of the frame, and then moved in direction as indicated by the arrow 30 (FIG. 4) along the longitudinal length of the frame. The muffins are engaged with rotation imparting chains and rotated about a generally vertical axis, that is an axis perpendicular to the plane of the muffin, which axis is also perpendicular to the upper reach of the belt 20. The chains used to rotate the muffins compare a pair of spaced-apart differential speed chains that have piercing elements thereon for slightly engaging the edges of the muffin on opposite sides thereof and causing it to be rotated because of the differential speed in the chains.

The chains are supported in a substantially identical manner on opposite sides of the belt, and include a first chain 31, and a second chain 32, both being guided to have chain lengths or sections going in the same direction as the arrow 30 above the belt 20 and spaced laterally apart as shown.

Figure 10:
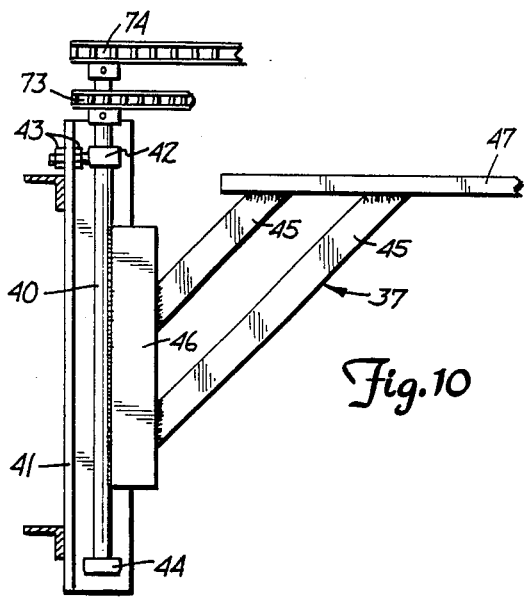
FIG. 10 is a framentary side view of an adjustable support for a drive chain used with the machine of the present invention.
Figure 11:
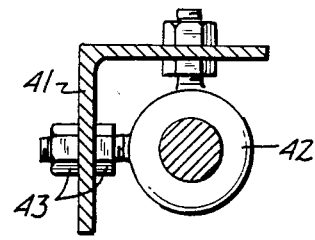
FIG. 11 is a sectional view taken as on line 11—11 in FIG. 10.

The chain supports comprise a plurality of idler sprockets 35 supported on a base plate 36. The plate 36 in turn is supported onto a first frame work 37 at a drive end, which will be the output end for the English muffins. Framework 37 is mounted similar to the support framework shown in U.S. Pat. No. 4,287,801 as shown in FIGS. 10 and 11. A shaft 40 is mounted onto an upright frame member 41 with a first rod end 42 that is clamped with a pair of lock nuts 43,43 to one of the legs of the angle iron upright member 41, and this then can permit the shaft 40 to be adjusted in a first direction by adjusting the lock nuts.

A second rod end 44 is mounted onto the shaft 40 at the lower end thereof, and this second rod end is adjustable with a pair of lock nuts, but adjustably mounted on a second leg of the upright angle iron support 41 so that the shaft 40 can be adjusted in a second direction perpendicular to the first direction for alignment purposes. Rod ends are conventional part-spherical beings held in housings that have the threaded shanks for mounting.

The frame 37 has an upright member 46 which is clamped to the shaft 40 (the shaft 40 does not rotate in use) and a pair of diagonal braces 45,45 are attached to the upright member 46, that is clamped directly to the shaft 40. The diagonal braces 45 support a top frame member 47 on which the plate support 36 of each of the chain assemblies is adjustably supported through the use of a slot 50 and a cap screw 51 (FIG. 4) that is connected to the respective horizontal member 47 of the corresponding frame.

Adjusting the lock nuts holding rod ends 42 and 43 will cause the outer end of the respective plate 36, that is the end opposite from the shaft 40 to be raised and lowered, or to be leveled in mutually perpendicular directions.

Figure 6:
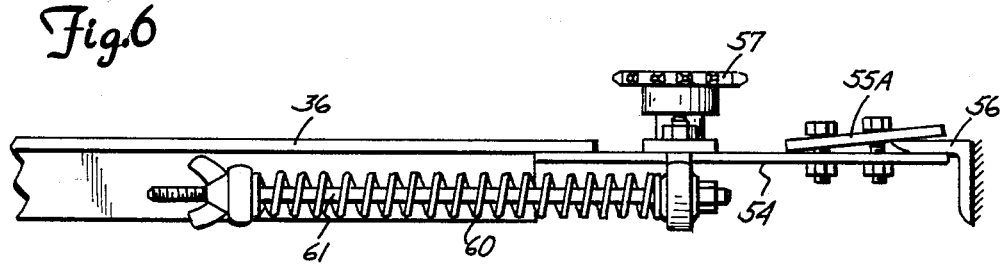
FIG. 6 is a sectional view taken as on line 6—6 in FIG. 4.

As shown in FIG. 5, the opposite end of each plate 36 from shaft 40 has a separate arm 54 fixed thereto that extends outwardly and has an outer clamp member 55 thereon which slides along a horizontal leg of an angle iron frame member 56. The clamp member 55 is clamped in position by tightening clamp bolts 55A, generally as shown in FIG. 6. Additionally, there is a tightener sprocket 57 mounted on a swinging arm 58 that is pivotally mounted with a bolt 59 to the arm 54, and a compression spring 60 mounted over an adjustable shaft 61 that is slidably mounted in a bracket 62 fixed to the respective plate 36 exerts a load on the pivot arm 58 to urge the sprocket 57 to tend to tighten the respective chain assembly 31 or 32.

The chain assembly 31 with the cutting blades 31A thereon is guided with suitable guides 65 that are connected to or supported on the plate 36 in a suitable manner. By adjusting the in and out position relative to the belt 20 by loosening the cap screw 51 and making the adjustment with the slots 50, and also then by loosening the clamp 55 and sliding the remote end of the chain support plate 36 along the support angle 56, the length of the chain adjacent the belt 20 can be made to run exactly parallel to the belt movement. The chain assembly 32 is adjusted in the same manner by using cap screw 50 and clamp plate 55 for the plate 36 on which chain assembly 32 is mounted.

A plurality of guides 65 of low friction material such as Nylon are formed to guide the chain 31. As can be seen, the chain 31 is a conventional roller chain. The guides 65 are held with clamps 66 that are mounted onto the plate 36. The guides 65 overlie the chain for chain 31, and the cutters 31A are thus below the guides in that the cutters 31A are on the bottom side of the chain 31. The guides 65 are used for maintaining the chain 31 in a properly aligned relationship, and prevent it from moving outwardly.

The clamps 66 comprise cross bars that overlie tail pieces 67 of the guides 65, and suitable cap screws 68 are used for clamping the cross bars down onto the tail pieces 67 to hold the guides in position after they have been adjusted properly. There can be a number of guides 65, selected to keep the chain properly oriented as it is driven.

The chain 31 is driven through the use of a motor gear reducer unit 70 that is mounted onto one wall of the frame, and a chain 71 is driven from a sprocket 72 on the output shaft of such motor. The chain 72 in turn drives a lower sprocket 73 of a sprocket assembly, and the upper sprocket 74 of this sprocket assembly is used for driving the chain 31. The sprocket assembly of sprockets 73 and 74 rotates on the shaft 40, and thus the drive is only through the chain 71 to drive the chain 31. The chain is driven so that the sections of the blades 31A adjacent to the belt 20 travel in the same direction as the belt, as shown by arrow 29.

The chain 32 is driven in the same manner as that described for chain 31, and each of the components is similarly numbered. However, chain 32 as shown is inverted from chain 31, so that the blades 32A are at the upper side of the chain 32. Additionally, the chain 32 is guided with upwardly opening guides, rather than downwardly opening. This is because the chain 32 is below the blades 32A, and these guides 77, as shown in FIG. 5, form an upwardly opening channel which is clamped with the clamp 66 in the same manner as before to the plate 36 on that side of the unit. The clamps 66 can be adjusted in and out as previously described to keep the chain 32 in proper alignment, and in particular in this case maintain the blade so that it does not extend outwardly over the belt 20 more than desired.

A motor 78 drives chain 32. The motor 78 drives a gear reducer 78A, similar to the gear reducer 70A. The output shaft of the gear reducer 78A has a sprocket pivotably mounted therein which drives a chain 70 that in turn drives idler sprockets or shaft 40 to drive the chain 32 as specified in relation to sprockets 78 and 74 for chain 31, but at a different speed, and is driven at a slightly higher speed than the chain 32. This slightly higher speed provides a lineal speed along the straight lengths of chain, carrying the blades, parallel to the path of the belt 20 and this in turn tends to rotate an English muffin shown at 80 on the belt in the direction as shown at 81 at a low rotational speed.

The chain speeds are selected to be substantially equal to the belt speed, and the only rotation is to insure that the muffin 80 makes one complete revolution from the time it is at a location where it is slightly sliced at a location indicated generally at 82 until it exits the slicing band in the area shown at 83 where the chains 31 and 32, and the respective blades 31A and 32A tend to move apart. It is between the straight lengths of chain while the muffin is being held by the blades slightly inserted into the edges of the muffin and as the muffin is being rotated that the muffin is scored (shallow slice) with a slicing blade shown generally at 90 in FIG. 5.

The slicing blade support is in the housing 15, and as shown in FIG. 8, the blade 90 is an endless, sharp band, commonly used for bread slicing. The housing 15 comprises a frame that has an outer cover 91 on one side connected to the main frame with hinges 92. The cover is shown open in FIG. 8, and the blade 90 is mounted on a first drive wheel 93 that is mounted onto the output shaft of a motor gear reducer unit 94 which in turn is supported on an end member 95 forming part of the frame for the housing 15. The motor gear reducer 94 is held with a suitable bracket 96 as shown. The output shaft 97 of the motor gear reducer is rotated as indicated by the arrow 98, to drive the blade 90 in direction as indicated by the arrow 99 in FIG. 8.

An idler belt wheel 101 is mounted onto an idler shaft 102 that is supported on suitable bearings 103 on a pivoting support plate 104. The support plate 104 is mounted to the frame 95 on upper members shown at 95A, with a suitable pivot bolt 105, so that this mounting plate 104 can move about an axis generally parallel to the axis of the shafts 97 and 102.

Tension is applied on the cutting band or blade 90 through the use of a spring 110 that is mounted with a suitable eye bolt 111 to the opposite end of frame 95 from the mounting of the bracket 96, and this spring 110 is connected to the lower end of the pivoting plate 104 through a toggle linkage illustrated generally at 112 which includes an actuator lever 113, and when the lever 113 is in its solid line position, the toggle linkage tightens the spring so that the blade 90 is maintained under a suitable tension as adjusted with the eye bolt 111.

The toggle lever 113 is made so that when it is in its solid line position it will contact a safety switch 115, provided for an interlock so that the blade 90 cannot be run unless the toggle lever is tightened and the blade is under tension.

A blade guide 115 is mounted onto a lower member of the frame 95, as shown, and has an adjustable bolt 116 that will permit moving the guide up and down. As shown in FIG. 5, the guide 115 supports the rear, unsharpened edge of the blade in its midpoint between the support wheels. The blade will slide on the guide while supported in this guide. The blade 90, as shown in FIG. 5, is supported at a level about at the mid-height of an English muffin 80, and just above the blades 32A on the chain 32. This is done so that there is not any interference between the blade 90 and the blades 32A, and although they are moving in the same direction, the blade 90 is travelling substantially faster than the blades 32A, so that there is a slicing action as the blade 90 travels and penetrates the English muffin around its edge. The penetration of the blade 90 will be approximately one-quarter of an inch into the peripheral edges of the English muffin.

The entire housing 15, as was previously explained, is mounted for pivotal movement about pivot pins 16, to the frame 11. As shown schematically in FIG. 7, the housing 15 is controlled through the use of a linear motor 120 that has its end mounted as at 121 to the end of frame 95 where the motor gear reducer is mounted, and has an actuator rod 122 that is connected to a bracket 123 that is fixed to an end member of the frame 11 a pivot connection 124. When the linear actuator is operated (it is an electric motor driven linear actuator of conventional design), the actuator will extend, causing the housing to tilt as shown in dotted lines in FIG. 7. The cover 91 is also shown in dotted lines in FIG. 7 moving toward its open position.

The actuator 120 is electrically operated, but will not be operable unless all of the other safety covers and safety cutoffs of the unit are indicating that things are properly shut off. For example, the motor 94 has to be stopped before the linear actuator 120 will operate.

Suitable guide members indicated generally at 130 and 131 (FIG. 9) are provided for guiding the muffins into the area between the chain carried blades 31A and 32A, and also for shielding the drive wheels 93 and 101 and the blade 90. The input guide 130 keeps the muffins from moving against the blade wheel 101, and exit guide 131 will tend to move an English muffin indicated at dotted lines at 80 in FIG. 9 slightly away from the blade 90 as the muffin exits the machine, to insure that the muffin will not stick to the blade 90 and be carried around the wheel 93.

In operation, the muffins are moved on a conveyor or other suitable loading device into the input end 126 of the prescoring unit, as seen in FIG. 4, and will move in direction of the arrows 30. The muffins will be guided in suitable guides. The conveyor belt 20 will be retained by its trough 27 so that it will be running on track at a desired speed. The muffins then enter the tapered "bite area 82 of the chains 31 and 32 (see FIG. 4), and are engaged by the blades 31A and 32A. The chains and belt are moving in the same direction.

Because the speed of the blades 31A, for example, is substantially the same as the speed of movement of the muffin, the blades merely pierce slightly into the skin of the muffin along its outer edges, and then the blades 32A, which are travelling somewhat faster than the blades 31A, will tend to rotate the muffin onto the blades as the muffin is moved. The rate of rotation about the axis of the muffin, again, is very slow because only one 360° turn of the muffin is required along the effective length of the parallel portions of the chains 31 and 21. The parallel portion of the chains is the effective working range of these blades.

At this time, the edges of the muffins are being engaged by the cutting blade 90, and are being sliced because the cutting blade is going substantially faster than the muffin, but in the same direction, along the lower length of the cutting blade that engages the muffins.

The guide member 131 (FIG. 9) then separates the muffin from the cutting blade 90 and moves it over toward one side of the belt 20 after the muffin has been released from the blades 31A and 32A. The muffin then exits the prescorer and is further processed, for example by "forking" the muffin, that is piercing the muffin with blades such as those shown in U.S. Pat. No. 4,287,801, for placing the muffin in its final form for commercial sale.

Electric eye sender-receiver sensors indicated generally at 135,135 are mounted at each end of the frame, so that when the covers are in place as shown in FIG. 3. Persons that attempt to insert their hands into the area where the muffins are being processed will break the beam from the sender-receiver sensor 135. The beams from sensors 135 are reflected from mirrors 136, respectively, back to the sensor. When the beam is blocked, the entire unit will shut down immediately.

It should be noted that the drive motor 94 includes a break unit that will stop the motor immediately upon deenergization. Brake units for electric motor are conventional, but are necessary here so that if something happens, the blade will stop immediately.

The cover 18 also is suitably interlocked, as shown schematically in FIG. 1, with a safety switch 138. This is shown merely schematically, but if the cover unit 18 is hinged up about its pivot point 19 away from its working position, a signal again is sent for interlock purposes to immediately stop all motors and shut the prescorer down so that no one will get their hands into the cutting blade 90 or the blades 31A.

Although the present invention has been described with reference to preferred embodiments, workers skilled in the art will recognize that changes may be made in form and detail without departing from the spirit and scope of the invention.

What is claimed is:

1. A prescoring machine for prescoring muffin-like bakery products comprising:
   a frame;
   an endless conveyor belt means mounted on said frame for movement in a longitudinal direction from adjacent a first end of said frame toward a second end of the frame, said belt having spaced marginal edges, a central longitudinal axis between said edges extending in direction of movement of the belts;
   a first endless chain member mounted on a first lateral side of the central axis of said belt, and first endless chain member being supported to have a first substantially straight length of chain substantially parallel to the longitudinal axis of the belt;
   first blade means mounted on said first chain and extending laterally therefrom, said blade means being positioned above said belt a desired amount, and overlying one marginal edge of the belt;
   a second endless chain means mounted on a second lateral side of the central axis of said belt, said second endless chain member being supported to have a second substantially straight length of chain substantially parallel to the longitudinal axis of the belt;
   second blade means mounted on said second chain and spaced above a second marginal edge of said belt and overlying said belt, said second blade means being at a different level from the first blade means and spaced from the first blade means a desired amount;
   power means to power said first and second chain members so that the chains move in substantially the same direction of said belt in the respective straight length sections, but at a differential in speed between the two chains; and
   a slicing blade mounted for movement along said belt and above said belt, said slicing blade being positioned to one side of the longitudinal axis of said belt and at a location wherein the slicing blade will penetrate the surface along the marginal sides of a muffin-like bakery product being carried on the belt between the straight lengths of said chains.

2. The apparatus as specified in claim 1 wherein said slicing blade comprises an endless sliding blade having a straight length section moving substantially parallel to both chains, and oriented substantially parallel to the path of movement of said belt, said straight length of the endless slicing blade moving in the same direction as said belt.

3. The apparatus as specified in claim 2 wherein said endless slicing blade moves at a lineal speed substantially greater than the speed of movement of said belt and chain members.

4. The apparatus as specified in claim 2 and means for mounting said endless slicing blade comprising a pair of blade mounting wheels, a second frame member pivotally mounted to said first frame member in a position to overlie portions of said first frame member and at least one of said chain members;
   means to rotatably mount said blade mounting wheels on said second frame member for rotation about axes generally perpendicular to the longitudinal axis of said belt, and power means to drive one of said blade mounting wheels.

5. The apparatus as specified in claim 4 including a pivoting wheel support pivotably mounted on the second frame, one of said blade mounting wheels being mounted onto the pivoting wheel support, and spring load means for moving said pivoting support about its axis to tend to create a tension in said endless slicing blade.

6. The apparatus as specified in claim 1 and a support channel for supporting the opposite surface of the length of said belt from the surface that carries said muffin-like bakery product.

7. The apparatus as specified in claim 1 and means mounting each of said chain members comprising a plate, each plate having a plurality of idler sprockets thereon, said plates being adjustably mounted with respect to said frame for orienting the straight length of chain associated with the respective plate in a desired location.

8. The apparatus as specified in claim 7 wherein each plate is mounted for individual adjustment toward and away from the longitudinal central axis of said belt.

9. The apparatus as specified in claim 7 wherein said idler sprockets are positioned to guide the chains in a shape which has at least one substantially straight length, and tapered end portions tapering away from the longitudinal central axis of said belt, said straight length portion being selected to be of a length relative to the differential in speed of movement of said chains so that a muffin-like bakery product will rotate substantially 360° along the stright lengths of said chains.

10. The apparatus as specified in claim 5 and detector means at first and second ends of said belt for detecting the presence of objects at selected locations above said belt.

11. The apparatus as specified in claim 5 and actuator means for moving said second frame chamber relative to said first frame, and sensor means to sense when the slicing blade is under tension, to disable said actuator means unless the slicing blade is under tension.

12. A machine for prescoring muffin-like products around the peripheral edge thereof, comprising:
   means for supporting a muffin-like product for movement along a plane in a path, said path having a central longitudinal axis;
   first and second muffin engaging means spaced apart and mounted above said plane a desired amount and movable in a second path comprising a portion of the first path of movement of said means to support and generally parallel to said plane for engaging opposite sides of a muffin-like product supported on said means for supporting;
   means for driving the means for engaging and for providing a differential in speed of movement of said first and second muffin-engaging means to tend to rotate a muffin-like product engaged about an axis generally perpendicular to said plane; and
   an endless slicing blade mounted above said plane, said slicing blade having a straight length which moves generally parallel to said plane at a position so that a cutting edge of said blade engages a side portion of a muffin-like product being moved along said plane and which is rotated by said means for engaging.

13. The apparatus as specified in claim 12 and a separate housing mounting said endless slicing blade, said separate housing being selectively movable about a pivot axis relative to said plane from a working position to a released position.

14. The apparatus as specified in claim 12 wherein said means for engaging comprises endless members moving in closed paths, and a portion of said closed path comprising straight lengths of said endless members positioned above said plane and spaced apart.

15. The apparatus as specified in claim 12 wherein said means for engaging comprise a plurality of blade members having sharpened points for slightly piercing the side of a muffin-like product being moved along said plane by the means for supporting.

* * * * *

UNITED STATES PATENT AND TRADEMARK OFFICE
CERTIFICATE OF CORRECTION

PATENT NO. : 4,581,970

DATED : April 15, 1986

INVENTOR(S) : Douglas R. Hanson

It is certified that error appears in the above-identified patent and that said Letters Patent is hereby corrected as shown below:

In claim 11, column 8, line 43, "chamber" should be --member--.

Signed and Sealed this

Sixteenth Day of September 1986

[SEAL]

Attest:

DONALD J. QUIGG

Attesting Officer

Commissioner of Patents and Trademarks